U S011763564B1

(12) United States Patent
Sadoughi Nourabadi et al.

(10) Patent No.: US 11,763,564 B1
(45) Date of Patent: Sep. 19, 2023

(54) TECHNIQUES FOR GENERATING OPTIMIZED VIDEO SEGMENTS UTILIZING A VISUAL SEARCH

(71) Applicant: Amazon Technologies, Inc., Seattle, WA (US)

(72) Inventors: Najmeh Sadoughi Nourabadi, Bellevue, WA (US); Kewen Chen, Bellevue, WA (US); Tu Anh Ho, Mercer Island, WA (US); Christina Botkins, Seattle, WA (US); Dongqing Zhang, Kirkland, WA (US); Muhammad Raffay Hamid, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/216,147

(22) Filed: Mar. 29, 2021

(51) Int. Cl.
*G06V 20/40* (2022.01)
*G06F 16/71* (2019.01)
*G06F 16/75* (2019.01)
*G06F 16/735* (2019.01)
*G06N 20/00* (2019.01)

(52) U.S. Cl.
CPC .............. *G06V 20/46* (2022.01); *G06F 16/71* (2019.01); *G06F 16/735* (2019.01); *G06F 16/75* (2019.01); *G06N 20/00* (2019.01); *G06V 20/41* (2022.01)

(58) Field of Classification Search
CPC ........ G06V 20/46; G06V 20/41; G06F 16/71; G06F 16/735; G06F 16/75; G06N 20/00

USPC ........................................................ 386/241
See application file for complete search history.

(56) References Cited

U.S. PATENT DOCUMENTS

| | | | |
|---|---|---|---|
| 2019/0289372 A1* | 9/2019 | Merler | H04N 21/251 |
| 2020/0004781 A1* | 1/2020 | Pereira | G06T 7/12 |
| 2020/0196022 A1* | 6/2020 | Sen | H04N 21/4884 |
| 2020/0221165 A1* | 7/2020 | Losev | H04N 5/262 |
| 2021/0046388 A1* | 2/2021 | Schwarz | H04N 21/8549 |
| 2021/0352382 A1* | 11/2021 | Channapragada | H04N 21/4882 |

FOREIGN PATENT DOCUMENTS

| | | | |
|---|---|---|---|
| CN | 110347872 A | * | 10/2019 |
| CN | 112738563 A | * | 4/2021 |

OTHER PUBLICATIONS

U.S. Appl. No. 17/216,147_Aug. 13, 2022_CN_110473200_A_H Apr. 2001 (Year: 2001).*

(Continued)

*Primary Examiner* — Loi H Tran
(74) *Attorney, Agent, or Firm* — Kilpatrick Townsend & Stockton LLP

(57) ABSTRACT

Systems and methods are provided herein for generating optimized video segments. A derivative video segment (e.g., a scene) can be identified from derivative video content (e.g., a movie trailer). The segment may be used a query to search video content (e.g., the movie) for the segment. Once found, an optimized video segment may be generated from the video content. The optimized video segment may have a different start time and/or end time than those corresponding to the original segment. Once optimized, the video segment may be presented to a user or stored for subsequent content recommendations.

19 Claims, 10 Drawing Sheets

(56) References Cited

OTHER PUBLICATIONS

U.S. Appl. No. 17/216,147_Aug. 13, 2022_WO_2020224325_A1_H Nov. 2020 (Year: 2020).*

English Translation of Chinese Publication CN 110347872 (Year: 2019).*

\* cited by examiner

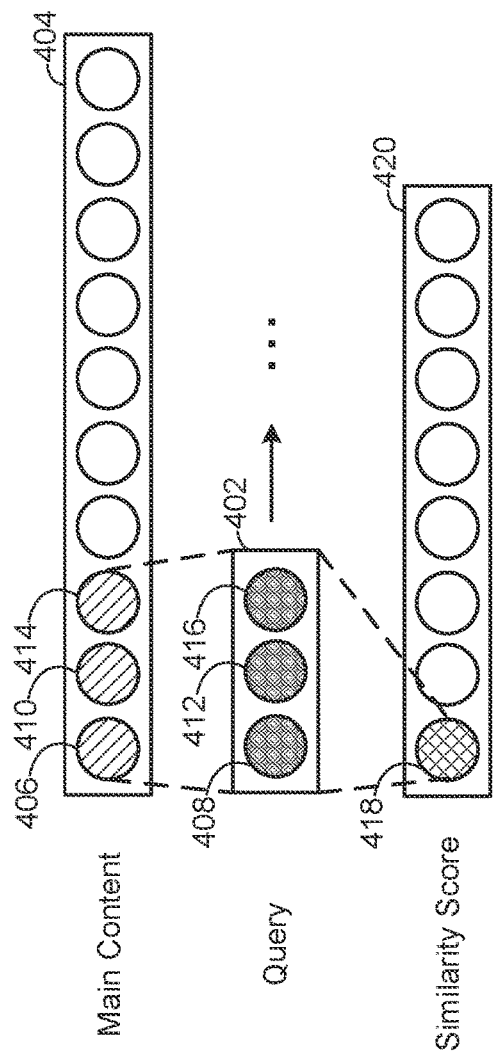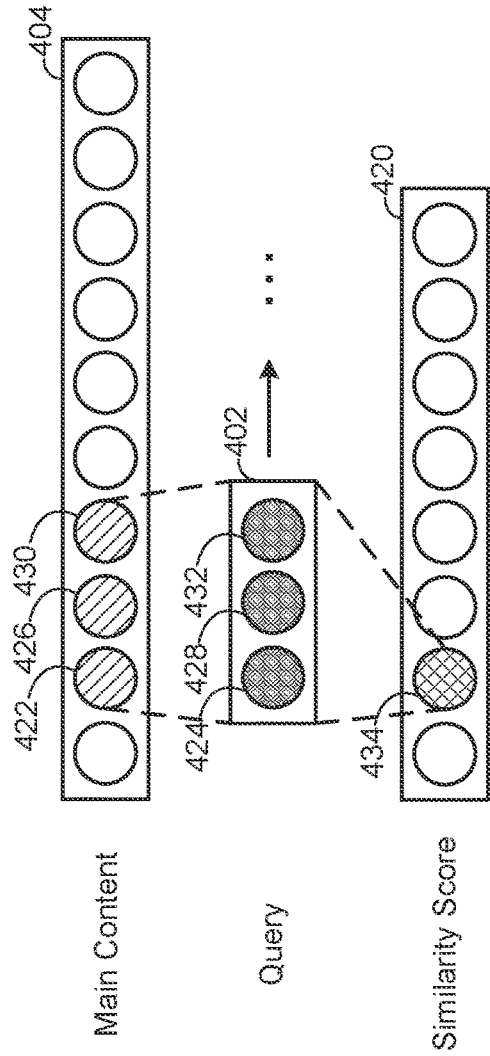

TECHNIQUES FOR GENERATING OPTIMIZED VIDEO SEGMENTS UTILIZING A VISUAL SEARCH

BACKGROUND

Modern video streaming services offer a wide variety of movies and television episodes. The sheer amount of viewing options can make it difficult for users to decide what to watch. Recent data indicates that users spend greater than two minutes and at least five webpage navigations to decide on streaming content or giving up altogether. While trailers or clips are sometimes available for video content, they have not been found to be the most effective in driving user engagement. Additionally, some trailers and/or clips include logos or other distracting images overlaid atop the video. Still further, sometimes the trailer/clip originally available to the user is in a language that the user does not speak. Embodiments of the invention discussed herein address these and other problems, individually and collectively.

BRIEF DESCRIPTION OF THE DRAWINGS

Various embodiments in accordance with the present disclosure will be described with reference to the drawings, in which:

FIGS. 4A and 4B are block diagrams illustrating an example process for identifying a starting time of a derivative video segment within the corresponding video utilizing a localization technique, in accordance with at least one embodiment;

DETAILED DESCRIPTION

Figure 1:
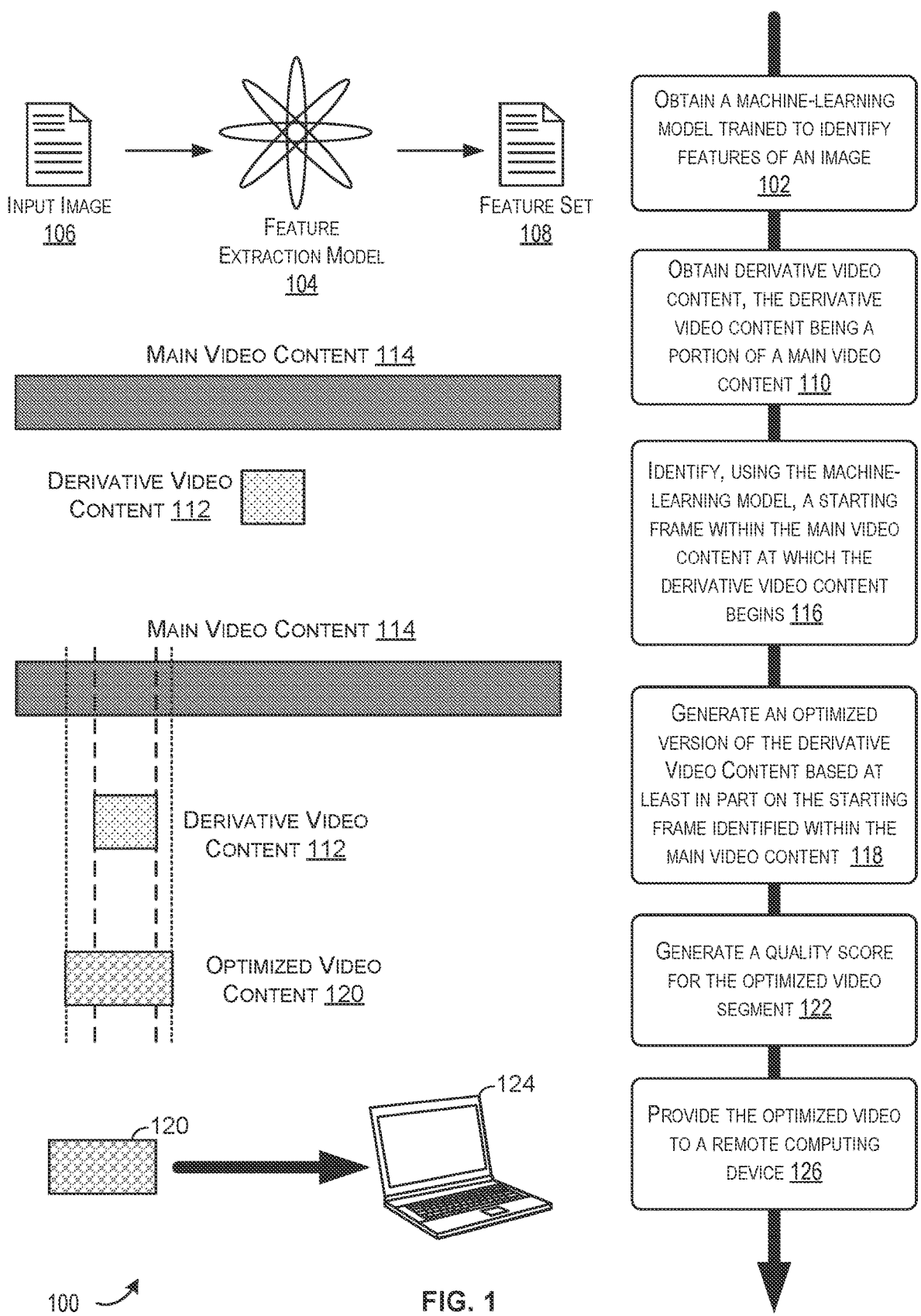
FIG. 1 is a flow for generating optimized video content utilizing a visual search engine, in accordance with at least one embodiment.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Conventionally, video trailers provided one of the more effective ways to engage users in a video. Trailers can be highly intricate and every segment is selected carefully by artists, researched, and tested with focus groups. Trailers allow the user a window shopping experience when perusing video content. However, experiments have shown that continuous clips (e.g., clips that are longer in duration than that usually provided in a trailer) selected from the main content drive more user engagement and acquisition compared with the content's official trailers. Techniques utilized herein leverage video trailers to generate an optimized video segments (e.g., a continuous clip corresponding to a shot of the trailer). These video segments (e.g., scenes, clips, shots, etc.) of the trailer can be segmented (e.g., identified and separated), then localized (e.g., identified) within the original video content (e.g., a movie, a television show, etc.) using a visual search engine.

The visual search engine may be configured to programmatically search for a starting/ending time of the video segment through a process of comparing features of the video frames of a video segment to features of the frames of the original content. Once identified, the starting and/or ending time may be adjusted based on a number of optimization factors. A new optimized video segment, starting and ending from the adjusted times, can be generated from the main content.

This newly optimized video segment can be assigned a quality score and/or one or more classifications identifying one or more attributes of the optimized video segment. In some embodiments, a subset of video segments corresponding to particular video content (e.g., a movie, a television show, etc.) may be selected from a set of optimized video segments based on the quality scores corresponding to each optimized video segment. This subset (or all) of the optimized video segments can be provided to a remote computing system. By way of example, the remote computing system may be a curation system that provides one or more user interfaces to review the optimized video segments. In some embodiments, at least one of the optimized video segments may be eventually provided to a user during a time when the user is browsing for content. In this manner, the user is provided data that is more likely to aid the user in determining interest in particular video content, which in turn, can reduce the time the user spends searching for content.

The video segments used as a query, although, nearly identical to its desired match within the main content, may still differ from the main content in aspects such as illumination, color, presence or absence of opening credits, presence or absence of logos, change in the audio/subtitle language of the video, border changes such as presence or absence of black boarders, presence or absence of dissolve or fade filters at different parts, orientation of some of the frames (i.e., they may be mirrored versions of each other), and presence or absence of other editing techniques used by the creators. Given these differences, utilizing features which extract low-level representations (e.g., features identified using a histogram of oriented gradients (HOG), fisher vectors, or the like) to identify matching video frames were found to be error prone. Instead, the disclosed techniques utilize features extracted using a deep machine-learning model trained in recognizing classes of the ImageNet dataset. The features extracted from a video frame by this model include more high level information which makes them more robust to the aforementioned differences.

In some embodiments, the visual search engine may be utilized to recreate videos (e.g., substantially recreate, but potentially with a different start and/or end time) that include logos or watermarks (e.g., image(s) which are overlaid atop the video frames of an instance of video content). By utilizing the techniques disclosed herein, the visual search engine may be used to identify a location of a video segment within the main content and regenerate a version of the video segment that does not include any overlaid images. Additionally, the visual search engine described herein may be utilized to generate a video segment originally provided in one language (e.g., a language that the user does not speak), in a different language (e.g., the user's native language). Thus, video content that required the user to use subtitles (e.g., due to not being fluent in the language in which the video was provided) can instead be viewed in a language in which the user is fluent.

By utilizing the techniques disclosed herein, the user may be provided more effective video segments with which to determine their interest in particular content. The optimized video segments can be classified such that providing these video segments to users may be performed in a customizable manner where the video segments are matched to the user based at least in part on the user's preference, past purchase or browsing history, and the like.

The techniques described above and below may be implemented in a number of ways and in a number of contexts. Several example implementations and contexts are provided with reference to the following figures, as described below in more detail. However, the following implementations and contexts are but a few of many.

Moving on to FIG. 1 which illustrates a flow 100 for generating optimized video content utilizing a visual search engine (e.g., the visual search engine 744 of FIG. 7), in accordance with at least one embodiment.

The flow 100 may begin at 102, where a machine-learning model (e.g., feature extraction model 104, may be obtained. The feature extraction model 202 may be previously trained to identify features of an image. For example, the feature extraction model 202 may be configured to identify feature set 108. The feature extraction model 202 may be discussed in further detail below with respect to FIG. 5.

At 110, derivative video content 112 may be obtained. In some embodiments, derivative video content 112 may include one or more portions of main video content 114. For example, derivative video content 112 may include one or more scenes, shots, clips, etc. from a movie (e.g., main video content 114). In some cases, the derivative video content 112 may be a professionally generated movie trailer. Derivative video content 112 may include any suitable number of segments from the main video content 114. These segments may be identified based at least in part on the segmentation techniques discussed in connection with FIG. 2. However, for the purposes of the example provided in FIG. 1, derivative video content 112 may be a single segment (e.g., a scene of a movie trailer between transitions of the movie trailer) derived from the main content 114 (e.g., the movie).

At 116, a starting frame (e.g., corresponding to a starting time) at which the derivative video content 112 begins within the main video content 114 may be identified using the machine-learning model (e.g., the feature extraction model 104). By way of example, frames of the derivative video content 112 and the main video content 114 may be provided to the feature extraction model 104 to obtain corresponding feature sets. Each pair of feature sets corresponding to each pair of frames (e.g., a frame of the derivative video content 112 and a frame of the main video content 114) may be compared and the similarity of the feature sets may be quantified in a similarity score based at least in part on the comparison. The best starting time may be selected based at least in part on these similarity scores that quantify the similarity between respective frames of the derivative video content 112 and respective frames of the main video content 114. As a non-limiting example, a highest similarity score corresponding to a particular frame (or set of frames) of the derivative video content 112 (e.g., a set of frames corresponding to the first n frames of the derivative video content 112) and a frame or set of frames corresponding to the main video content 114 may be selected. A frame of the main video content 114 corresponding to the highest similarity score may be identified as a suitable starting point and a starting time corresponding to that frame may be selected as the starting time at which the derivative video content 112 starts within the main video content 114.

At 118, an optimized version of the derivative video content (e.g., optimized video content 120) may be generated. By way of example the optimized video content 120 may be generated based at least in part on the starting frame identified within the main video content 118. In some embodiments, the optimized video content 120 may have a different starting time and/or ending time than the starting/ending time of the derivative video content 112. For example, in some embodiments, a shot detection algorithm may be utilized to identify a start or end of the shot (e.g., the last abrupt transition that occurs before the original starting time identified for the derivative video content, the next abrupt transition following the original ending time identified for the derivative video content). The starting and/or ending time may be adjusted to the time identified for the start or end of the shot (or a time with a threshold after the start of the shot, or a time within a threshold before the end of the shot). In some embodiments, the starting and/or ending time (as adjusted for the shot, or prior to adjustment) may be analyzed to determine if dialog is detected at the starting time and/or ending time. If dialog is detected at the starting time of the derivative video content 112, the starting time of the optimized video content 120 may be shifted a predetermined period of time earlier within main video content 114 until a starting time is identified for the optimized video content 120 at which no dialog is detected. The ending time for derivative video content 112 may be similarly adjusted to identify an ending time for the optimized video content 120 such that the ending time is selected for a point in the main video content at which no dialog is detected. Once starting and ending times for the optimized video content 120 are identified, the optimized video content 120 may be generated by lifting (e.g., copying) the main video content 114 corresponding to the content occurring between the starting and ending time identified for the optimized video content 120.

In some embodiments (e.g., when derivative video content 112 includes more than one segment from the main video content 114), a quality score may be generated for the optimized video segment at 122. For example, the optimized video content 120 (and at least one other optimized video content generated from the main video content 114 and corresponding to a portion of derivative video content 112) may be ranked according to any suitable factor. Some example factors may include audio and/or visual modalities such as voice activity detection, luminance, average amount of perceived loudness, average amount of human voice activity, average facial area, presence of opening credits, average amount of motion, and the like. Once ranked, a subset of optimized video segments (e.g., of which optimized video content 120 is an example) may be selected and provided to a remote computing device 124 at 126.

By way of example, a subset (e.g., the top ten) of the optimized video segments may be transmitted to a curation system. The remote computing device 124 may operate as part of this curation system or separately. In some embodiments, the curation system may be configured to provide one or more interfaces with which users (e.g., curators) may view the candidate segments (e.g., optimized video segments) to associate various features with the optimized segments. For example, the users may be provided the ability to indicate whether a candidate segment is appropriate for later presentation to users (e.g., users of a streaming platform from which the main video content 114 is accessible, and at which the derivative video content may be provided). As another example, the curation system may provide one or more interfaces with which the optimized video segments may be classified and/or categorized. For example, the optimized video content 120 may be associated with a particular category (e.g., "drama") from a predefined set of categories (e.g., genres of movies such as drama, action, comedy, horror, etc.). In some embodiments, a user (e.g., a customer of service provider that offers main video content 114 for consumption) may provide a set of preferences indicating categories of content with which the user is interested in viewing or a set of categories may be identified for the user based at least in part on their past viewing and/or purchase history. In some embodiments, a user may be presented a particular optimized video segment (e.g., via the remote computing device 124, a user computing device) over other optimized video segment based at least in part on the user's preferences, the categories associated with past purchase/viewing history, the respective categories associated with the optimized video segments, or the like, or any suitable combination of the above. The process for generating optimized video segments is discussed in further detail with respect to FIGS. 2-6.

Figure 2:
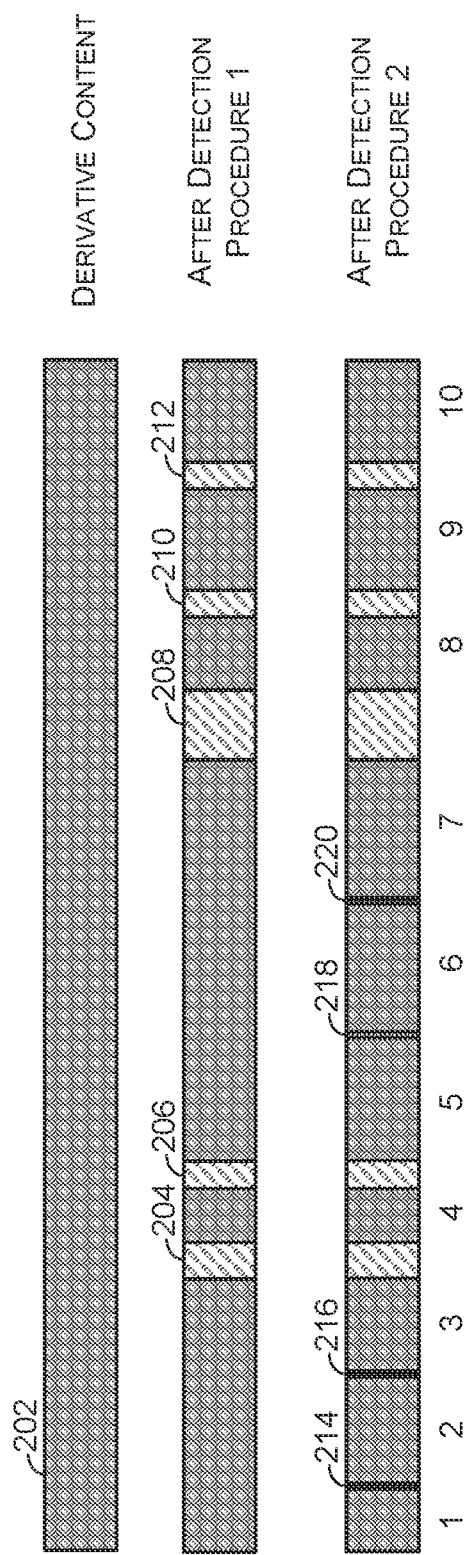
FIG. 2 is a block diagram describing techniques for segmenting an input video, in accordance with at least one embodiment.

FIG. 2 is a block diagram 200 describing techniques for segmenting an input video, in accordance with at least one embodiment. Derivative content 202 may include any suitable number of clips/shots. In some embodiments, the derivative content 202 may be a movie or television trailer that corresponds to a respective movie or television show. "Derivative content" is used herein to refer to video content that is derived from one or more portions of other video content (referred to as "main content").

In some embodiments, a segmentation process is performed to by detecting transitions between shots in the derivative content 202 resulting in disjoint continuous segments of videos (e.g., a number of derivative video segments). A shot is used herein to refer to a continuous sequence of images captured during "record" and "stop" operations. During video editing, shots can be stitched together with abrupt or gradual transitions. The disclosed techniques detect these transitions.

Figure 3:
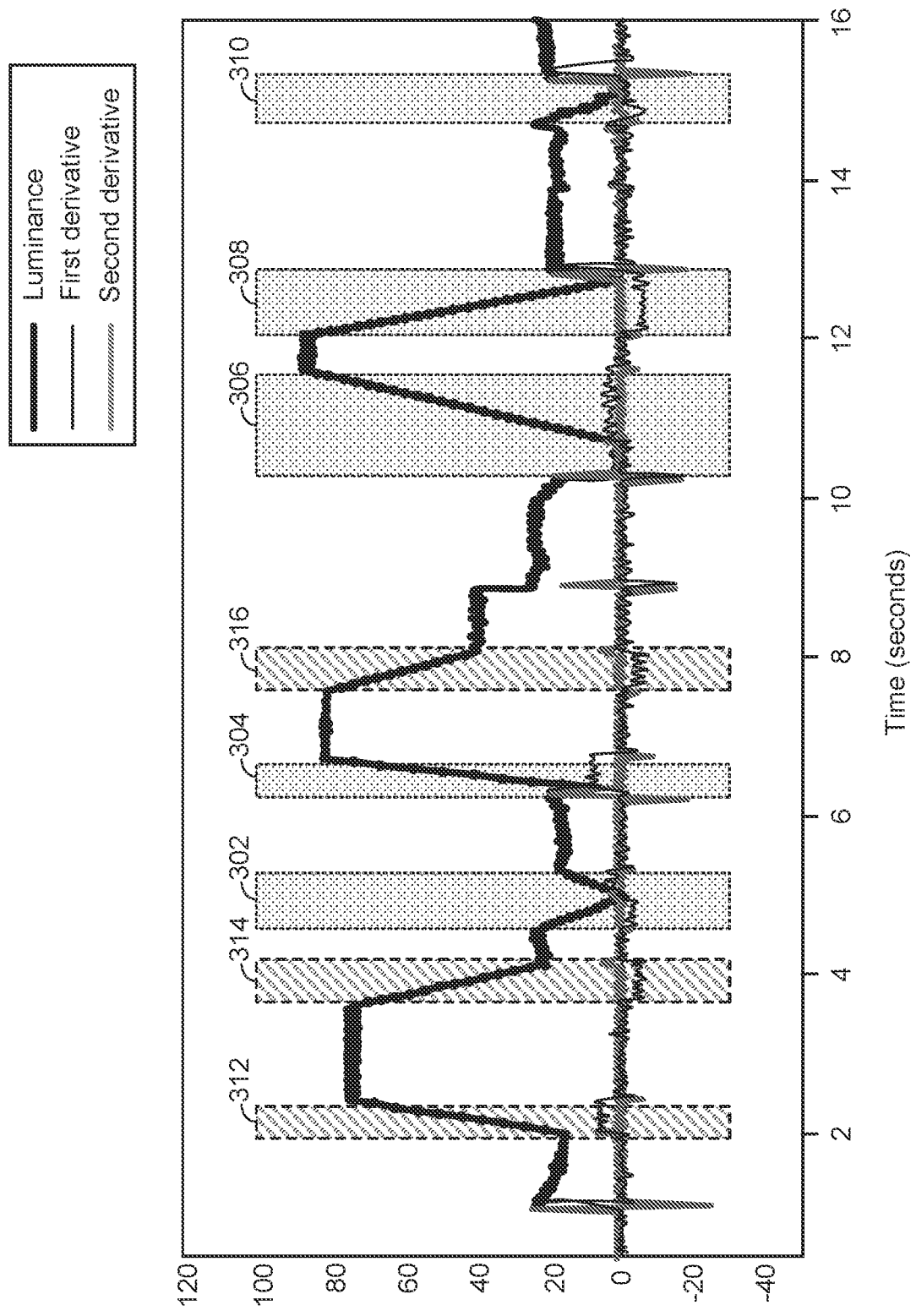
FIG. 3 is a graph illustrating an exemplary luminance curve with its corresponding first and second derivatives, in accordance with at least one embodiment.

In some embodiments, a first detection procedure (e.g., detection procedure 1) may be performed to identify gradual transitions (e.g., transitions 204-212) using a luminance curve. FIG. 3 depicts an example luminance curve that may be utilized for this first detection procedure.

FIG. 3 is a graph 300 illustrating an exemplary luminance curve with its corresponding first and second derivatives, in accordance with at least one embodiment. In some embodiments, the luminance of each video frame in the derivative content 202 of FIG. 2 may be plotted on graph 300. The first derivative and second derivative of the curve may be calculated and plotted on the graph 300 as well. In some embodiments, a gradual transition (e.g., a fade, dissolve, etc.) may be detected by identifying the negative spike (e.g., a negative value over a predefined threshold such as 0.4, 0.5, etc.) in the second derivative of the frame luminance curve while the first derivative remains relatively constant as the spike occurs. As depicted in FIG. 3, boxes 302-310 are each intended to illustrate an example of a gradual fade detected within the derivative content. Boxes 312-316 are each intended to illustrate an example of a dissolve transition detected within the derivative content.

Returning to FIG. 2, gradual transitions 204-212 may be examples of fade and/or dissolve transitions identified using the techniques discussed above in connection with FIG. 3. In some embodiments, gradual transitions (e.g., transitions 201-212) may be identified at any suitable time; before, after, or concurrently with the identification of the abrupt transitions (e.g., transitions 214-220). Thus, the terms "first" and "second" detection procedure are merely used to differentiate each procedure from the other, rather than necessarily assigning an order to those procedures.

In some embodiments, a second detection procedure (e.g., detection procedure 2) may be performed to identify abrupt transitions (e.g., transitions 214-220) within the derivative content 202. The second detection procedure may utilize a number of video frame features such as histogram of a color space, edge tracking, compression differences and motion vectors may be utilized for shot detection. For example, to detect the abrupt transitions within derivative content, color histogram differences may be utilized. A color histogram of each frame may be calculated and the distance of the histogram features between pairs of consecutive frames can be compared. If the different between the histograms exceeds a predefined threshold, a transition may be identified.

As a non-limiting example, abrupt transitions (e.g., transitions 214-220) may be identified within derivative content 202 based at least in part on generating a histogram of HSV colors (e.g., colors from the HSV color space) for each pair of two consecutive frames. A Bhattacharyya distance between each pair of HSV histograms may be calculated. If the distance exceeds a threshold (e.g., 0.3, 0.5, etc.), an abrupt transition is identified. In at least one embodiment, the second detection procedure may maintain knowledge of the nearest abrupt/gradual transition to ensure that there are at least some predefined number of frames in the resulting segment (e.g., at least 30 frames, at least 50 frames, etc.). A segment (e.g., a short segment) that is identified between two transitions, but is less than a predefined threshold (e.g., 30 frames, 50 frames, etc.) may be added to a segment sequential occurring before or after the short segment in order to ensure that each segment identified is over a predefined threshold. In this case, a transition between the short segment and the segment immediately preceding or proceeding the short segment may be ignored. Any suitable number of segments may be combined in order to ensure that each final segment (the segments remaining after the first and/or second detection procedure) are at least a predefined minimum threshold (e.g., 30 frames, 50 frames, etc.) or duration (e.g., 30 seconds, 60 seconds, etc.).

As shown in FIG. 2, a number of segments N may be identified subsequent to running detection procedures 1 and 2. As depicted in FIG. 2, 10 segments are identified (e.g., segments 1-10). The segments may be indexed and/or identified with any suitable identifier. (e.g., 0, 1, 2, "seg1," etc.).

FIGS. 4A and 4B illustrate an example process 400 for identifying a starting time of a derivative video segment (e.g., segment 1 of FIG. 2) within the corresponding video utilizing a localization technique, in accordance with at least one embodiment. As shown in FIG. 2, N disjoint continuous query segments from the derivative content 202 are identified. Each segment may then be localized (e.g., identified) within the main content from which derivative content 202 was derived (referred to herein as the "main content") utilizing the process 400.

By way of example, particular vide segment (e.g., segment 1 of FIG. 2) may be selected and used as a query to perform a visual search of the main content. In some embodiments, a predefined sampling interval (e.g., 5 frames per second (fps), 10 fps, etc.) may be utilized to identify a sampling of video frames from the query (e.g., segment 1) and the main content. This may be utilized to increase the performance of the search as searching the sampling of frames can be performed faster than utilizing every frame of the derivative content and main content. By way of example, a sampling interval of 10 fps may be utilized to sample the query and the main content. This sampling frequency can select $l_{qi}$ number of frames for the $i^{th}$ query (e.g., frames 402 depicting $l_{qi}$ number of frames for segment 1 of derivative content 202), and $l_v$ number of frames (e.g., frames 404) for the main content. In some embodiments, frames 402 may include any suitable number of frames (e.g., the first 3 frames, the first 5 frames) sampled from the beginning of the $i^{th}$ query (e.g., segment 1 of derivative content 202). In some embodiments, frames 402 may include any suitable number of frames (e.g., the last 3 frames, the last 5 frames, etc.) sampled from the end of the $i^{th}$ query (e.g., segment 1 of derivative content 202). In still other embodiments, frames 402 may include all, or some subset, of the frames sampled from the derivative content 202. From each of the identified frames (e.g., frames 402 and 404), a set of features may be extracted utilizing a machine-learning model (e.g., a convolutional neural network) that has previously been trained (e.g., via supervised, unsupervised, and/or semi-supervised machine learning algorithm and a predefined image dataset) to classify an image provided as input. By way of example only, the machine-learning model may be convolutional neural network (e.g., ResNet-50) that is 50 layers deep and pre-trained with more than a million images from an image dataset (e.g., the ImageNet dataset). In some embodiments, the machine-learning model may be configured to output a classification of the image provided as input. However, in some embodiments, the output of the last layer before classification may be utilized to obtain convolutional features. This output may be utilized to compare two video frames to assess a similarity between the two.

Figure 5:
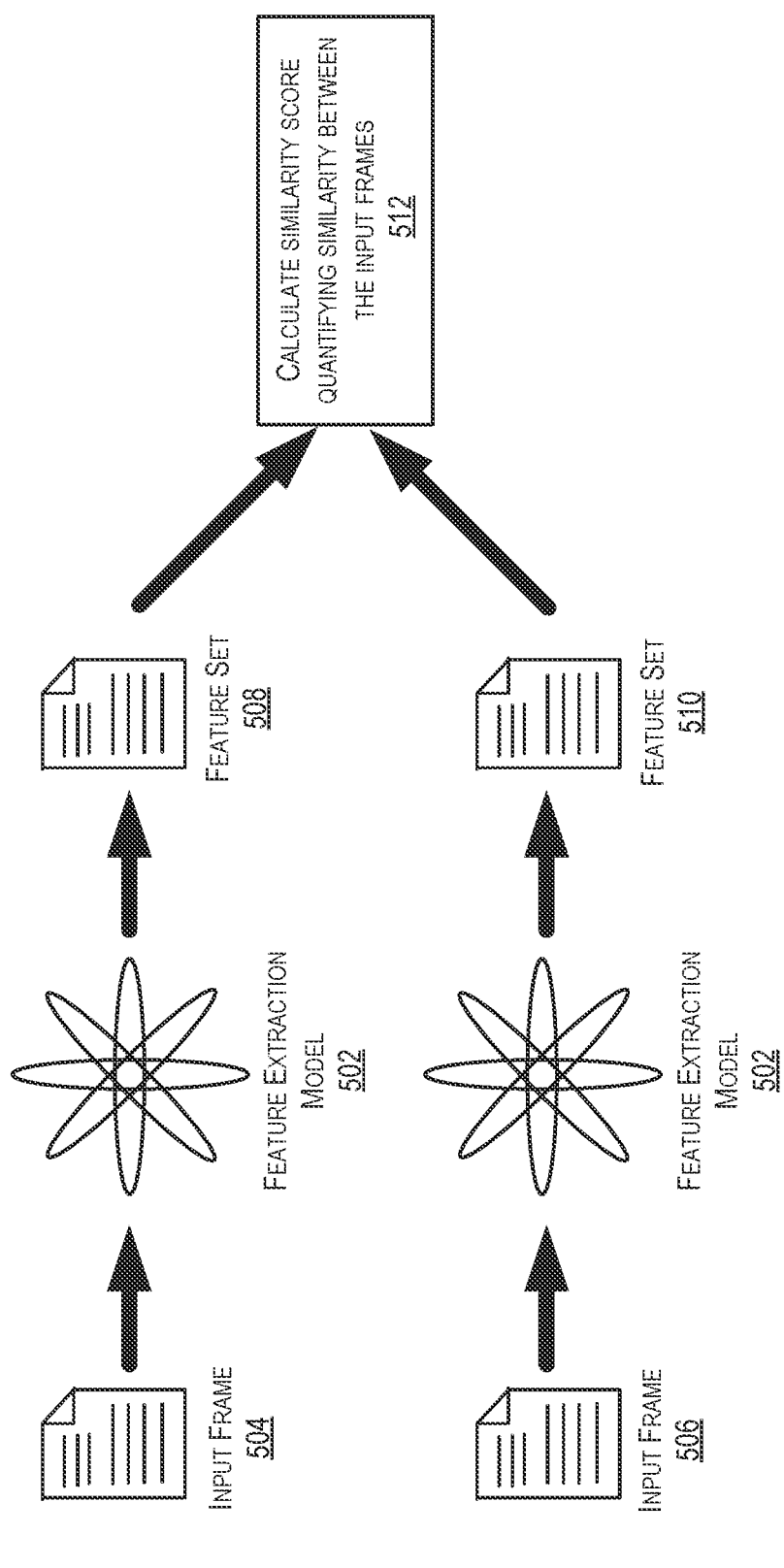
FIG. 5 is a block diagram illustrating example techniques for comparing two video frames, in accordance with at least one embodiment.

FIG. 5 is a block diagram 500 illustrating example techniques for comparing two video frames, in accordance with at least one embodiment. Feature extraction model 502 may be the convolutional neural network described above in connection with FIG. 4. Each input frame (e.g., input frame 504 corresponding to frame 406 of FIG. 4, input frame 506 corresponding to frame 408 of FIG. 4A) may be provided separately as input to feature extraction model 502 to obtain feature set 508 and feature set 510, respectively. The output of the last layer before classification where the convolutional features have undergone a global average pooling result in feature vectors of size f=2048 for each input image. The result of this step on the $i^{th}$ query and the main content are $Q_i \in \mathbb{R}^{l_{qi} \times f}$ and $V \in \mathbb{R}^{l_v \times f}$. Feature set 508 may include the features extracted from input frame(s) 504 (e.g., any suitable combination of feature sets for frames 406, 410, and/or 414) and provided as output by the last convolutional layer prior to classification by the feature extraction model 502. Similarly, feature set 510 may include the features extracted from input frame 506 (e.g., any suitable combination of feature sets for frames 408, 412, and/or 416) and provided as output by the last convolutional layer prior to classification by the feature extraction model 502. A similarity score may be calculated at 512 by comparing the feature sets 508 and 510. The similarity score may quantify a degree of similarity (or dissimilarity) between the two sets of input frames (e.g., a set (input frame(s) 504) of one or more frames from frames 406, 410, and/or 414 and a set (input frame(s) 506) of one or more frames from frames 408, 412, and 416).

Returning to FIG. 4A, similarity score may be calculated for each pair of inputs (e.g., a pair including the set of frames 406, 410, and 414 and the set, frames 408, 412, and 416). By way of example, a normalized cross correlation (NCC) between $Q_i$ and V features at starting point n may be calculated by:

$$(Q_i \star V)[n] = \frac{\sum_{j=0}^{l_q} Q_i[j] \cdot V[n+j]}{\|Q_i\| \|V_{n:n+l_q}\|}$$

In some embodiments, if the input frame(s) 504 and/or 506 include less than the number of frames than found in frames 402, the similarity scores of each of these comparisons may be combined utilizing a predefined rule set to calculate similarity score 418. By way of example, if a similarity score is identified as described in FIG. 5 using each pair of input frames 406/408, 410/412, and 414/416, then each similarity score identified for each pair may be combined utilizing a predefined rule set to calculate similarity score 418. Similarity score 418 may quantify a degree of similarity (or dissimilarity) between the set of frames 406, 410, and 414 of the main content and the set of frames 408, 412, and 416 of the query (e.g., segment 1 of FIG. 2). Although three frames of each the main content and query are used in this example to calculate similarity score 418, any suitable number of frames may be utilized from each the main content and query. In some embodiments, the specific number of frames may be determined based on any suitable factor such as how many frames are included in frames 402 and/or frames 404, an amount of processing resources available for the system, a particular sampling frequency utilized, by user input identifying a specific number of frames to be utilized for each calculation of a similarity score in scores 420, or the like.

FIG. 4B illustrates a next pass of the process 400. In this pass, each set of frames (e.g., a set of frames 422, 426, and 430 and a set of frames 424, 428, and 432) may be provided separately to the feature extraction model 502 of FIG. 5 as described above. Each input set may result in a corresponding set of features extracted from each set of frames which may be compared to calculate a similarity score as described at 512 of FIG. 5. The resulting similarity score may be combined according to the predefined rule set to calculate similarity score 434. This process may be continued any suitable number of times until each of the similarity scores 420 is calculated. The particular number of similarity scores included in similarity scores 420 may vary based at least in part on the number of frames of frames 402 and 404.

Once each of similarity scores 420 are calculated, the best starting time for the query (e.g., segment 1 of FIG. 2) may be selected based at least in part on the calculation:

$$n^* = \underset{\{0,\ldots,l_v-l_q\}}{\arg\max}\ ((Q_i \star V)[.])$$

In some embodiments, an ending time may be initialized derived based at least in part on the length of the query. By way of example, if the query (e.g., segment 1) is 30 seconds in length, then the ending time of the localized segment (e.g., a segment of the derivative content 202 as identified in the main content as starting at the starting time determined by process 400) may be the length of the segment (e.g., 30 seconds) added to the identified best starting time.

In some embodiments, the process 400 may be repeated any suitable number of times. By way of example, the process 400 may be repeated for each of the segments (e.g., segments 1-10) of the derivative content 202 of FIG. 2. To identify a starting point of each segment of derivative content 202 within the main content from which derivative content 202 was derived.

Figure 6:
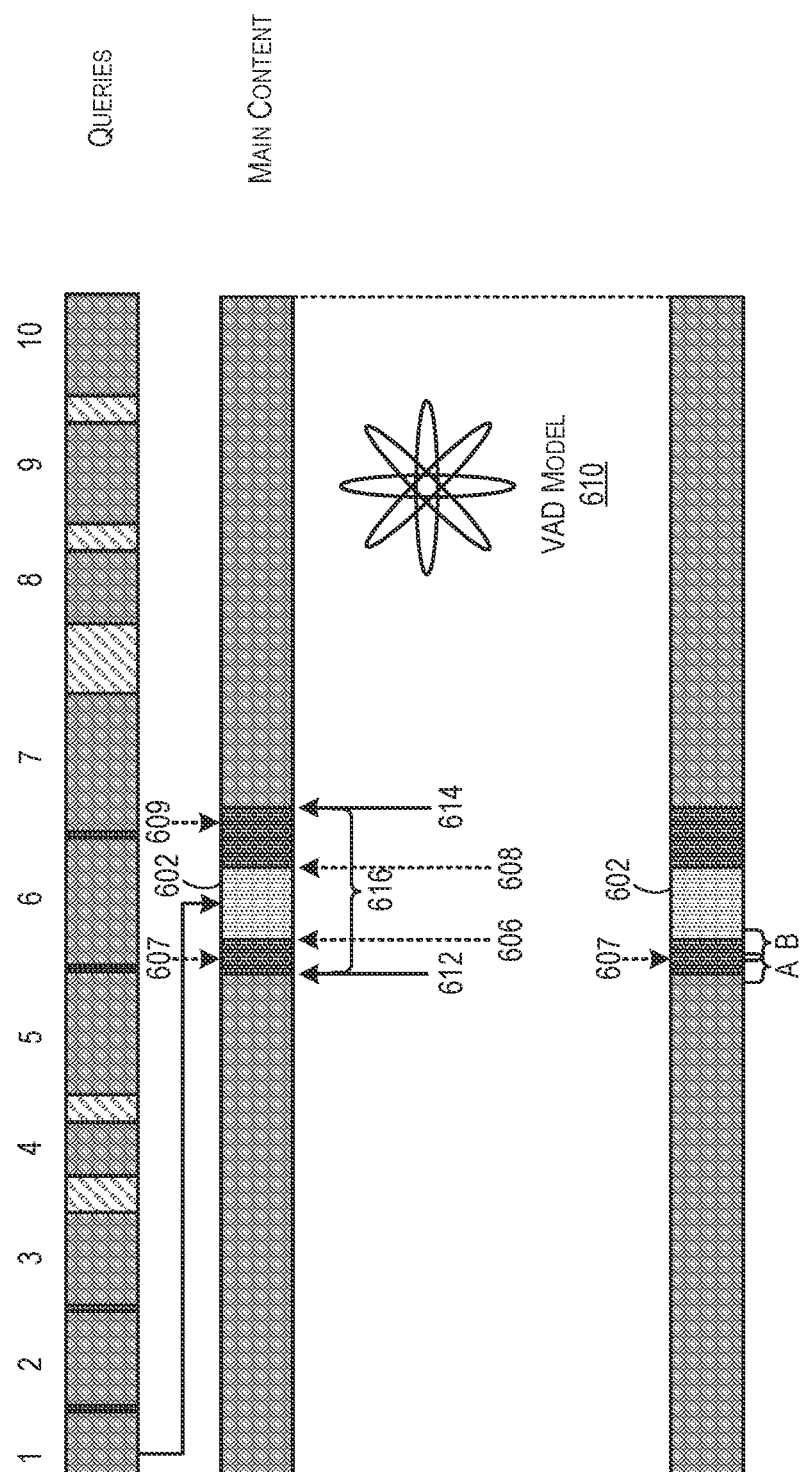
FIG. 6 is a block diagram illustrating example techniques for identifying a starting and ending time for an optimized segment corresponding to a video query, in accordance with at least one embodiment.

FIG. 6 is a block diagram 600 illustrating example techniques for identifying a starting and ending time for an optimized segment corresponding to a video query, in accordance with at least one embodiment. Segment 602 (e.g., corresponding to segment 1 of FIG. 2) may be localized within the main content utilizing the techniques described above in connection with FIGS. 4 and 5. In some embodiments, the segment 602 may be lifted (e.g., copied) from the main content utilizing the starting and ending times (e.g., starting time 606 and ending time 608) identified above in connection to FIG. 4.

In some embodiments, a number of algorithms may be utilized to adjust the starting and ending time for the segment 602 with the main content. By way of example, a shot detection algorithm may be utilized to identify an abrupt transition preceding the start time originally identified utilizing the techniques described above in connection with FIG. 4. The shot detection algorithm may utilize a similar set of operations with respect to identifying abrupt transitions (e.g., transitions 214, 216, 218, and 220) as discussed above in connection with FIG. 2. For example, a set of video frames of the main content that occur at or before the starting time of the segment 602 may be selected. As a non-limiting example, 30 seconds worth of video frames ranging from 30 seconds before the starting time to the starting time may be selected from the main content. Respective histograms (e.g., histograms of the HSV color space) may be generated for each pair of consecutive video frames of the set. The histograms can be compared (e.g., utilizing a Bhattacharyya distance calculated between each frame of a pair). When the comparison indicates a distance that exceeds a predefined threshold, an abrupt transition can be considered to be occurring between the frames of that pair. Through these comparisons, the starting time for segment 602 may be adjusted earlier within the main content to starting time 607. Similarly, an abrupt transition occurring after the ending time 608 may be identified. The ending time 608 may be adjusted to the ending time 609 corresponding to the time at which the abrupt transition occurs. By adjusting the starting time 606 and the ending time 608, the system can ensure that an entire shot corresponding to the segment 602 may be utilized.

In some embodiments, starting time 607 (and/or ending time 609) may occur in the middle of dialog of the main content. To avoid interrupting speech, a voice activity detection (VAD) model (VAD model 610) may be utilized to avoid starting times and/or ending times that occur in the middle of a dialog. VAD model 610 may be previously trained to detect voice dialog from audio. In some embodiments, the input features to the model are mel-spectogram magnitudes extracted from an audio segment (e.g., 1000 milliseconds (ms) of audio) from the segment 602. In some embodiments, the audio segment may be transformed into a number of windows with a predetermined amount of overlap (e.g., 100 ms windows with 50 ms overlaps), resulting in X samples (e.g., 41 samples). Any suitable number of mel-scale filters F (e.g., 60) may be utilized to filter 1026 bins of spectogram magnitude. The result may include a feature vector with X*F dimensions for one audio segment.

In some embodiments, the VAD model 610 may be composed of two long short-term memory (LSTM) layers using 256 and 128 nodes, respectively. Each LSTM layer may be stacked with a dropout layer with dropout probability of 0.2. These layers may be followed by a dense output layer for binary classification (e.g., dialog present, dialog not present). In some embodiments, the VAD model 610 may be trained with supervised learning techniques and a labeled dataset of audio and binary voice labels (e.g., dialog present, dialog not present) derived from subtitles. The VAD model 610 may be trained to detect the presence of dialog speech. In some embodiments, to determine whether a segment boundary of segment 602 (e.g., the portion of the segment 602 at starting time 607, the portion of the segment 602 at ending time 609) is interrupting a dialog, it can be assumed that the segment boundary is in the middle of dialog if there is a positive inference from the VAD model 610 in the neighborhood of the segment boundary.

To determine whether the segment boundary corresponding to the starting time 607 of segment 602 is interrupting dialog, a window can be defined. By way of example, two windows (e.g., window A and window B, each being a predefined length such as one second) surrounding the potential starting time can be identified as the neighborhood surrounding starting time 607. An audio segment corresponding to window A may be provided as input to VAD model 610 and an outcome (e.g., outcome A) may be received. Similarly, the audio segment corresponding to window B may be provided as input to VAD model 610 and an outcome (e.g., outcome B) may be received. A dialog interruption can be identified as existing if either of these outcomes (e.g., outcome A or B) have a positive result (e.g., dialog present) from VAD model 610. In some embodiments, if the VAD model 610 identifies the segment boundary as interrupting dialog, the starting time 607 may be modified to a predetermined period of time earlier (e.g., 5 seconds) in the main content and the process of accessing the segment boundary corresponding to the starting time (e.g., now starting time 612) may be performed anew. This may be repeated any suitable number of times until the VAD model identifies the starting time (e.g., starting time 612) as corresponding to the first set of windows identified by the VAD model 610 as not having dialog present. A similar process may be performed to identify an ending time that does not interrupt dialog. In some embodiments, prior to analyzing the windows that correspond to the ending time, the ending time 609 may be adjusted such that the segment 602 is at least some predefined duration (e.g., 60 seconds from start time 612). Additionally, or alternatively, the process for identifying an ending time may be repeated any suitable number of times until 1) dialog is identified by the VAD model 610 as not being present in the audio corresponding to two windows corresponding to the ending time being analyzed and 2) the duration of the segment 602, with respect to the starting time 612 is at least some predefined duration (e.g., 60 seconds, 90 seconds, etc.). In some embodiments, ending time 614 may be identified utilizing this process.

Utilizing the detection techniques described above reduces the chance of creating disruptive segments. In some embodiments, an audio visual fading may be applied to the beginning and ending of segment 602 (as adjusted, segment 616). This audio visual fading may rely on a predetermined window duration (e.g., 1.25 seconds, 1 seconds, etc.).

The segment 616 corresponding to the segment 602 as adjusted, may be copied from the main content. Segment 616 may be considered an optimized video segment corresponding to the segment 602.

The techniques described above in connection with FIGS. 4-6 may be repeated for any suitable number (e.g., 1, 2, all, some, etc.) of the segments 1-10 identified in connection with FIG. 2. By way of example, the techniques of FIGS. 4-6 may be repeated for each of the segments 1-10 to generate optimized video segments.

In some embodiments, the optimized video segments may be ranked according to one or more predefined metrics. In some embodiments, these metrics may be from audio and visual modalities. Factors utilized for this ranking may be identified in more detail with respect to FIG. 8.

Although the example herein implied that the main content is a single source of content (e.g., a movie, a specific television episode, etc.) it should be appreciated that in some embodiments, the main content may include any suitable number of sub-content portions (e.g., episodes of a television series, movies of a television mini-series, an act in a televised play, etc.). By way of example, the main content may be a television series that includes any suitable number of episodes (e.g., 246 episodes of a series, 24 episodes of a season, etc.). For example, derivative content derived from such main content can include segments derived from any number of television episodes of the series. Thus, the visual search operations described herein may be utilized to isolate/localize the starting time/ending time of a given segment from the set of episodes as a whole. In these examples, each episode may be utilized as an instance of main content with respect to searching for the derivative content. If the derivative content is not found in the current episode, another episode (e.g., a next episode) may be searched. This process may occur any suitable number of times until either 1) the derivative content is found or 2) there are no more portions (e.g., episodes) of the main content to search.

Figure 7:
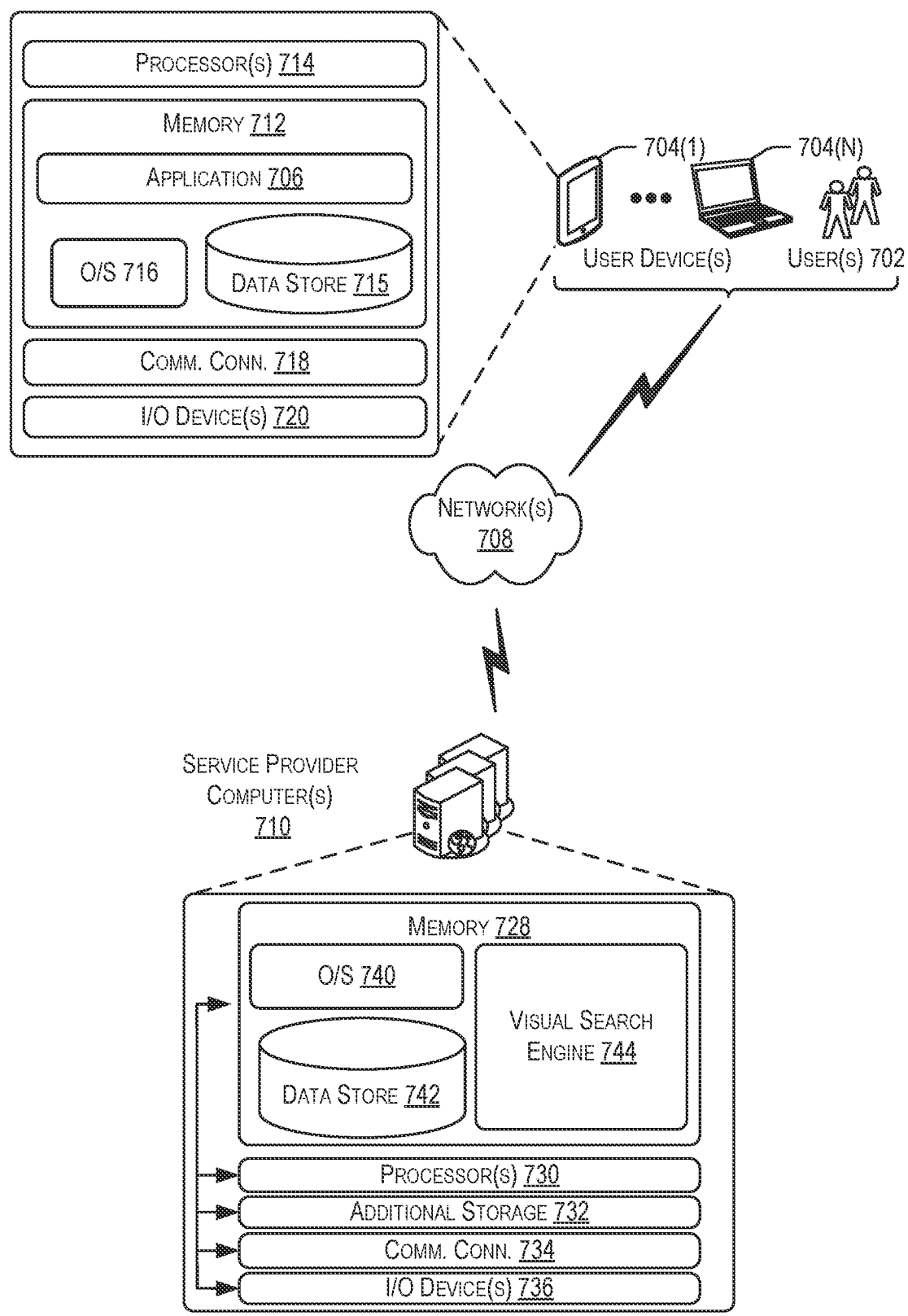
FIG. 7 illustrates components of a visual search system, in accordance with at least one embodiment.

FIG. 7 illustrates components of a system 700 according to a particular embodiment. In system 700, one or more users 702 may utilize a user device (e.g., a user device of a collection of user devices 704(1)-(N) (collectively, user devices 704) to navigate to a network page provided by the service provider computer(s) 710. For example, the user(s) 702 may access a user interface accessible through an application 706 running on the user devices 704 via one or more networks 708. In some aspects, the application 706 operating on the user devices 704 may be hosted, managed, and/or provided by a computing resources service or service provider, such as by utilizing one or more service provider computer(s) 710. As a non-limiting example, the user(s) 702 may be a customer of a service provider that offers video content (e.g., movies, television episodes/series, etc.) for consumption (e.g., lease, rent, purchase, etc.). The user(s) 702 may be provided optimized video content (e.g., optimized video content 120 of FIG. 1, optimized video segment 616 of FIG. 6) at a user interface provided by application 706. In some embodiments, the optimized video content provided to the user(s) 702 may be provided based at least in part on a user selection, user preferences indicating one or more categories of content with which the user is interested, past purchase and/or viewing history associated with the user, one or more content categories with which one or more optimized video segments are associated, or any suitable combination of the above.

In some examples, the networks 708 may include any one or a combination of many different types of networks, such as cable networks, the Internet, wireless networks, cellular networks, and other private and/or public networks. While the illustrated example represents the users 702 accessing application functionality over the networks 708, the described techniques may equally apply in instances where the users 702 interact with the service provider computer(s) 710 via the one or more user devices 704 over a landline phone, via a kiosk, or in any other suitable manner. It should be appreciated that the described techniques may apply in other client/server arrangements, as well as in non-client/server arrangements (e.g., locally stored applications, etc.).

The service provider computer(s) 710, perhaps arranged in a cluster of servers or as a server farm, may host the application 706 operating on the user devices 704 and/or cloud-based software services. Other server architectures may also be used to host the application 706 and/or cloud-based software services. The application 706 (e.g., a web browser, a shopping application, etc.) operating on the user devices 704 may be capable of handling requests from the users 702 and serving, in response, various user interfaces that can be rendered at the user devices 704. By way of example, the application 706 may provide any suitable user interface elements for obtaining one or more user-defined addresses. The application 706 operating on the user devices 704 can present any suitable type of website that supports user interaction, including search engine sites, item detail pages, streaming services network pages, shopping cart network pages, and the like. The described techniques can similarly be implemented outside of the application 706, such as with other applications running on the user devices 704.

The user devices 704 may be any suitable type of computing device such as, but not limited to, a mobile phone, a hand-held scanner, a touch screen device, a smartphone, a personal digital assistant (PDA), a laptop computer, a desktop computer, a thin-client device, a tablet PC, an electronic book (e-book) reader, etc. In some examples, the user devices 704 may be in communication with the service provider computer(s) 710 via the networks 708, or via other network connections.

In one illustrative configuration, the user devices 704 may include at least one memory 712 and one or more processing units (e.g., processor(s) 714). The processor(s) 714 may be implemented as appropriate in hardware, computer-executable instructions, firmware, or combinations thereof. Computer-executable instruction or firmware implementations of the processor(s) 714 may include computer-executable or machine-executable instructions written in any suitable programming language to perform the various functions described.

The memory 712 may store program instructions that are loadable and executable on the processor(s) 714, as well as data generated during the execution of these programs. Depending on the configuration and type of user computing device, the memory 712 may be volatile (such as random access memory (RAM)) and/or non-volatile (such as read-only memory (ROM), flash memory, etc.). The user devices 704 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 712 may include multiple different types of memory, such as static random access memory (SRAM), dynamic random access memory (DRAM), or ROM.

Turning to the contents of the memory 712 in more detail, the memory 712 may include an operating system 716, one or more data stores 715, and one or more application programs, modules, or services for implementing the techniques disclosed herein, provided via the application 706. The application 706 may be configured to receive, store, and/or display a network page or other interface for interacting with the service provider computer(s) 710. Additionally, the memory 712 may store access credentials and/or other user information such as, but not limited to, user IDs, passwords, and/or other user information. In some examples, the user information may include information for authenticating an account access request such as, but not limited to, a device ID, a cookie, an IP address, a location, or the like.

The user devices 704 may also contain communications connection(s) 718 that allow the user devices 704 to communicate with a stored database, another computing device or server (e.g., the service provider computer(s) 710), user terminals and/or other devices on the networks 708. The user devices 704 may also include I/O device(s) 720, such as a keyboard, a mouse, a pen, a voice input device, a touch input device, a display, speakers, a printer, etc.

In some aspects, the service provider computer(s) 710 may also be any suitable type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the service provider computer(s) 710 are executed by one more virtual machines implemented in a hosted computing environment. The hosted computing environment may include one or more rapidly provisioned and released computing resources, which computing resources may include computing, networking and/or storage devices. A hosted computing environment may also be referred to as a cloud-computing environment. In some examples, the service provider computer(s) 710 may be in communication with the user devices 704 and/or other service providers via the networks 708 or via other network connections. The service provider computer(s) 710 may include one or more servers, perhaps arranged in a cluster, as a server farm, or as individual servers not associated with one another. These servers may be configured to implement the functionality described herein as part of an integrated, distributed computing environment.

In one illustrative configuration, the service provider computer(s) 710 may include at least one memory 728 and one or more processing units (e.g., processor(s) 730). The processor(s) 730 may be implemented as appropriate in hardware, computer-executable instructions, firmware, or combinations thereof. Computer-executable instruction or firmware implementations of the processor(s) 730 may include computer-executable or machine-executable instructions written in any suitable programming language to perform the various functions described.

The memory 728 may store program instructions that are loadable and executable on the processor(s) 730, as well as data generated during the execution of these programs. Depending on the configuration and type of service provider computer(s) 710, the memory 728 may be volatile (such as RAM) and/or non-volatile (such as ROM, flash memory, etc.). The service provider computer(s) 710 or servers may also include additional storage 732, which may include removable storage and/or non-removable storage. The additional storage 732 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 728 may include multiple different types of memory, such as SRAM, DRAM, or ROM.

The memory 728, the additional storage 732, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 728 and the additional storage 732 are all examples of computer storage media. Additional types of computer storage media that may be present in the service provider computer(s) 710 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the service provider computer(s) 710. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The service provider computer(s) 710 may also contain communications connection(s) 734 that allow the service provider computer(s) 710 to communicate with a stored database, another computing device or server, user terminals and/or other devices on the networks 708. The service provider computer(s) 710 may also include I/O device(s) 736, such as a keyboard, a mouse, a pen, a voice input device, a touch input device, a display, speakers, a printer, etc.

Turning to the contents of the memory 728 in more detail, the memory 728 may include an operating system 740, one or more data stores 742, and/or one or more application programs, modules, or services (not depicted) for implementing the features disclosed herein (e.g., such as the techniques described above with respect to FIGS. 1-6 which may be performed by the visual search engine 744).

Figure 8:
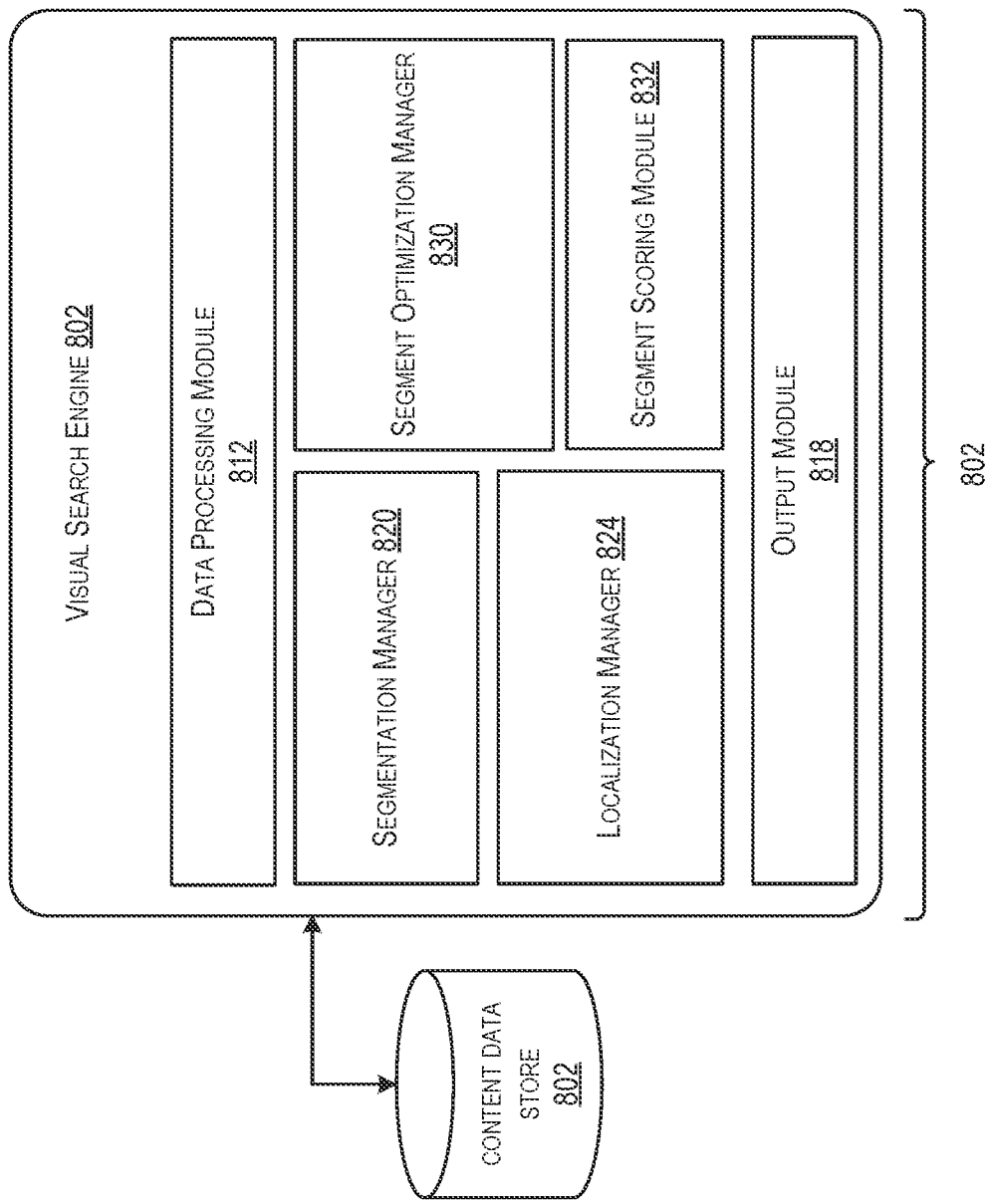
FIG. 8 illustrates an example computer architecture of a visual search engine, in accordance with at least one embodiment.

FIG. 8 illustrates an example computer architecture of a visual search engine 800 (an example of visual search engine 744), including a plurality of modules that may perform functions in accordance with at least one embodiment. The modules 802 may be software modules, hardware modules, or a combination thereof If the modules 802 are software modules, the modules 802 can be embodied on a computer readable medium and processed by a processor in any of the computer systems described herein. It should be noted that any module or data store described herein, may be, in some embodiments, be a service responsible for managing data of the type required to make corresponding calculations. The modules 802 may be exist as part of the visual search engine 800 operating on the service provider computer(s) 710 of FIG. 7, or the modules may exist as separate modules or services external to the service provider computer(s) 710 (e.g., as part of the application 706 of FIG. 7 operating on the user devices 704 of FIG. 7).

In the embodiment shown in the FIG. 8, a content data store 804 is shown, although data can be maintained, derived, or otherwise accessed from various data stores, either remote or local to the visual search engine 800, to achieve the functions described herein. In at least one embodiment, the data stores described herein may be physically located on the user device(s) 704 or alternatively, any suitable combination of the data stores may be operated as part of the service provider computer(s) 710 (or accessible to the service provider computer(s) 710), for example, as part of a visual search engine 800. The visual search engine 800, as shown in FIG. 8, includes various modules such as a data processing module 810, a segmentation manager 812, a localization manager 814, a segment optimization manager 816, a segment ranking module 818, and an output manager 820. Some functions of the modules 810-820 are described below. However, for the benefit of the reader, a brief, non-limiting description of each of the modules is provided in the following paragraphs. In accordance with at least one embodiment, a process is enabled for providing an optimized video segment as described above in connection with FIGS. 1-6.

In at least one embodiment, the visual search engine 800 includes the data processing module 810. Generally, the data processing module 810 may be utilized to receive any suitable information with respect to any example provided herein. The data processing module 810 may include any suitable number of application programming interfaces with which the functionality of the visual search engine 800 may be invoked. In some embodiments, the data processing module 810 may receive a request to generate a set of optimized video segments from a particular derivative segment identified in the request. In some embodiments, the data processing module 810 may receive a request to generate a set of optimized video segments corresponding to a batch of derivative segments (e.g., any suitable number of trailers). In some embodiments, the data processing module 810 may be configured to pass one or more derivative segment identifiers (or an identifier for a data set corresponding to any suitable number of derivative segments of the content data store 804) to segmentation manager 812. In some embodiments, the functionality described below with respect to the following modules may be provided any suitable number of times with respect to any suitable number of instances of derivative content (e.g., 10 movie trailers, 100 movie trailers, 1000 movie trailers, etc.). In some embodiments, a request received by the data processing module may simply request a start time, end time, and/or location (by any suitable index) of a particular instance of derivative content (e.g., a movie clip) within main content corresponding to the particular instance of derivative content (e.g., the corresponding movie).

In some embodiments, the segmentation manager 812 may be configured to perform any suitable operations discussed above in connection with FIGS. 2 and 3. By way of example, the segmentation manager 812 may be configured to perform any suitable number of procedures (e.g., detection procedures 1 and/or 2 of FIG. 2) to detect one or more segments within an instance of derivative content. The segmentation manager 812 may be configured to identify one or more types of transitions (e.g., fades, dissolves, abrupt transitions, etc.) between segments of an instance of derivative content (e.g., derivative content 202 of FIG. 2, a movie trailer). The segmentation manager 812 may be configured to utilize a luminance curve such as the one discussed above in connection to FIG. 3 to identify fades and/or dissolves within a given instance of derivative content. In some embodiments, the segmentation manager 812 may be configured to identify abrupt transitions based at least in part on comparing features of consecutive frames (e.g., HSV color spaces corresponding to pixels of each frame) to identify a difference between the consecutive frames that exceeds a predetermined threshold. The segmentation manager 812 may identify a segment (e.g., segments 1-10 of FIG. 2) based at least in part on the transitions identified. In some embodiments, the segmentation manager 812 may discard or otherwise ignore any segments that do not exceed a threshold duration (e.g., at least 30 seconds, at least 15 seconds, etc.).

Each segment identified by the segmentation manager 812 may be provided to the localization manager 814. In some embodiments, the localization manager 814 may be configured to perform the operations discussed above in connection with FIGS. 4 and 5. By way of example, the main content corresponding to each segment may be obtained from content data store 104. The main content may be sampled (e.g., a frame at every 10 seconds of the main content may be retrieved). The segment may similarly be sampled. One or more frames of the derivative content (e.g., frames 402 of FIG. 4) and one or more frames of the main content (e.g., the sampled frames of the main content) may be individually provided to the feature extraction model 502 to identify feature sets corresponding to each frame. Different pairs of these feature sets (e.g., a feature set corresponding to one or more sequential frames of the derivative content and a feature set corresponding to one or more sequential frames of the main content) may be compared and a similarity score generated as described at 512 of FIG. 5. In some embodiments, a number of similarity scores (e.g., similarity scores corresponding to comparing frame pairs 406/408, 410/412, and 414/416) may be combined according to a predefined rule set to calculate a single similarity score corresponding to a particular starting time/starting frame of the main content. In some embodiments, a single similarity score can be calculated (e.g., at 512 of FIG. 5) per pass (e.g., at FIG. 4A, at FIG. 4B) and a combination of similarity score may not be performed. Said another way, a single similarity score can be calculated based on comparing features of one frame set including multiple frames of the derivative content and features of another frame set including multiple frames of the main content). A best-scored starting time/starting frame of the main content may be selected as being the best starting time for the derivative content within the main content based on these similarity scores. A similar process may be performed to identify a best ending time for the derivative content within the main content.

The starting time and ending time identified by the localization manager 814 may be provided to the segment optimization manager 816. The segment optimization manager 816 may be configured to perform any suitable operations discussed above in connection with FIG. 6. By way of example, the segment optimization manager may be configured to adjust the starting time and/or ending time within the main content corresponding to the derivative content based at least in part on a predefined rule set. In some embodiments, the starting time and/or ending time of the derivative content within the main content may be adjusted based at least in part on identifying that the starting time and/or ending time occurs in the middle of vocal dialog occurring within the main content. In some embodiments, the starting time and/or ending time may be adjusted to ensure that the optimized video content generated from the main content and corresponding to the derivative content is of at least a predetermined duration (e.g., at least 60 seconds, etc.). The segment optimization manager 816 may be configured to generate one or more optimized segments based at least in part on the starting/ending times it has identified. In some embodiments, the optimized video segments are generated based at least in part on copying a segment from the main content from the starting time to the ending time within the main content. The optimized video segment may include at least the derivative video segment. In some embodiments, the optimized video segment may be generated to be of a duration that is longer than the duration of the derivative video segment.

In some embodiments, the segment ranking module 818 may be configured to rank the optimized video segments generated by segment optimization manager 816. In some embodiments, the optimized video segments may be ranked according to any suitable audio and/or video attribute. By way of example, for audio, audio features such as loudness and average dialog voice activity detection may be utilized to rank the optimized video segments. In some embodiments, video features may be extracted from the optimized segment. These video features may include an estimated luminance, an average face area, the presence of opening credits, the average amount of motion in the optimized video segment, and the like. Some or all of these video features may be utilized to rank the optimized video segments. The following includes additional details to some example features with which the optimized video segments may be ranked. For each feature, a score may be calculated. The scores may be combined to generate a quality score for each optimized video segments.

Segment Duration

In some embodiments, the duration of derivative video content 112 in the optimized video segment 120 may be an indicator of how engaging the video may be to the user. Accordingly, a score for the duration of the optimized video segment may be calculated. By way of example, a duration score may be calculated for each optimized video segment that indicates a similarity between the starting time of the segment and the starting time of the corresponding optimized video segment. An exponential time decay may be utilized to score optimized video segments according to their closeness to the beginning of the corresponding original segment. Let $S_i$ be the set of all frames in the $i^{th}$ segment belonging to the derivative content 202, denoted $D_i$. A duration score may be calculated with the following formula.

$$D_i = \sum_{t=0}^{T_i} \mathbb{1}_{x_t \in S_i}\left(\text{sim}(x_t) \times e^{\frac{-s}{T}}\right)$$

Optical Flow

In some embodiments, an amount of motion may be identified for a given optimized video segment. In some embodiments, optimized video segments that contain a larger amount of motion may be scored and/or ranked higher than other optimized video segments which contain less motion. In some embodiments, motion (e.g., optical flow) within a given optimized video segment can be calculated based at least in part on the displacement of pixels in horizontal and vertical dimensions within the various frames of the optimized video segment. For calculating the optical flow, a duality based approach may be employed for a real time TV-L1 algorithm which relies on an efficient numerical schema to solve a relaxed version of the problem with alternation. The average magnitude of motion vectors for all the pixels in one frame may be identified as a measure of motion intensity (e.g., a motion score). The motion scores for each frame can then be weighted by using the exponential time decay function to weigh the localized frames according to their closeness to the start of the video asset. The weighted motion scores can be combined (e.g., added) to provide a cumulative overall motion displayed by optimized video segment.

Loudness

In some embodiments, the segment ranking module 818 may execute a loudness estimation algorithm (e.g., ITU-R BS.1770-4) which provides a measure of objective loudness. In some embodiments, this loudness estimation algorithm exploits a sliding window of 400 ms with 0.75 overlap. In some embodiments, the loudness estimation algorithm determines an average of audio signal's power after removing the silent blocks (i.e., where power <70 decibels) to provide an overall loudness score.

Average Dialog Voice Activity

The segment ranking module 818 may utilize the VAD model 610 of FIG. 6 on the entire optimized video segment using a window size of a predetermined duration (e.g., 1 second, 3 seconds, etc.) and steps of a predetermined size (e.g., 1 second steps, 2 second steps, etc.) resulting in a set of features, for example $f_{vad} \in \mathbb{R}^{n_{vad} \times 1}$, where $n_{vad}$ is the number of steps. To achieve a single metric, an average of this metric across $n_{vad}$ can be calculated. The average represents the average amount of dialog voice activity in the optimized video segment.

Luminance

In some embodiments, to estimate the luminance scores for the pixels in the image, a luma component (i.e., Y) from the YUV color encoding system may be utilized. Assuming that the luminance scores do not change much in the interval of 1 second, the average luminance of the pixels for the frames in the optimized video segment can be extracted using a sampling interval of 1 second to reduce the redundant computations. These values can then be averaged across the number of frames to provide a metric corresponding to the amount of perceptual brightness included in the optimized video segment.

Average Facial Area

In some embodiments, a pretrained multi-task convolutional neural network (MTCNN) model may be utilized to detect a facial area. For example, the area of all face instances detected in the model in one frame may be added and normalized by the area of the frame. The average face area for frames in the clip with a sampling interval of 1 second (e.g., based on an assumption that the average face area in a video does not change much over a course of 1 second, or any suitable sampling rate). The average of these values can be averaged across the number of frames. The resulting value is a metric that represents an average frontal face area in the optimized video segment.

Opening Credits Recognition

In some embodiments, the segment ranking module 818 may perform any suitable operations for recognizing/detecting opening credits within the optimized video segment. In some embodiments, segments that include opening credits may be ranked lower (e.g., deprioritized) than that does not include opening credits. This may be due to the assumption that segments which contain opening credits may be disruptive to the user (e.g., the user may be distracted from assessing the video segment for interest because they are distracted with the credits).

In some embodiments, a hybrid method combining a machine-learning model with a set of rules may be utilized to identify the presence of opening credits. It may be assumed that the opening credits appear in the first x minute (e.g., 2 minutes, 20 minutes, 10 minutes, etc.) of the optimized video segment. It may also be assumed that opening credits have a higher brightness than the corresponding backgrounds of such frames to be easily readable by the viewer. A model may be obtained that has been pre-trained for character region awareness for detecting text boxes within various frames of an optimized video segment. Once these frames are identified, a k-means clustering or any other clustering algorithm may be applied on the luminance of the pixels within each detected text box. Assuming the majority of the pixels on the border of the box belong to the background, the brightness of the characters and their background can be identified. The difference between foreground and background average luminance scores can be calculated and compared against a predetermined difference threshold to determine whether the detected box contains opening credits.

Composite Sum

In some embodiments, the segment ranking module 818 may be configured to utilize any suitable combination of the scores/metrics described above identify a composite score. The composite score may be utilized to rank a set of two or more optimized video segments. In some embodiments, the segment ranking module 818 may normalize each metric separately such that each metric's range becomes bounded (e.g., between 0 and 1). The segment ranking module 818 may calculate the weighted sum of all metrics as the composite sum score. Each metric/score (e.g., corresponding to the segment duration, optical flow, loudness, average dialog voice activity, luminance, average facial area, and/or opening credits) may be weighted equally, or each metric/score may have a corresponding weight that may be cause a given metric to be weighted more heavily or less heavily than other metrics/scores. By way of example, each metric/score above may be weighted equally except for the opening credits score, which can be in some embodiments weighted ten times more than the others.

In some embodiments, the output module 820 may be configured to provide one or more optimized video segments to a remote computing device (e.g., a computing device that is separate from the computing device on which video search engine 800 operates). In some embodiments, the remote computing device can be any suitable system and/or device, such as, but not limited to, a curation system and/or a user device as described above.

Figure 9:
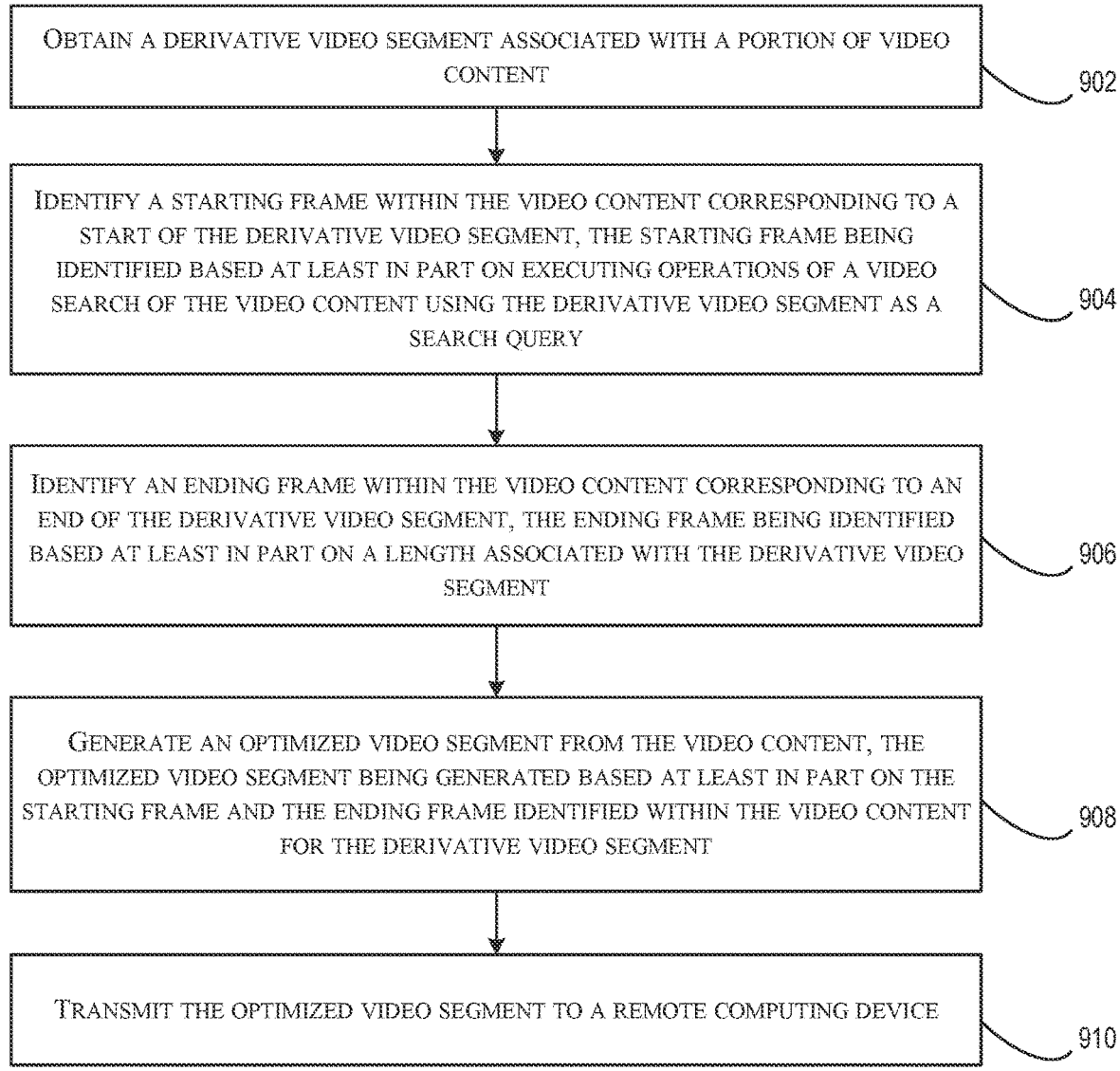
FIG. 9 is a flowchart illustrating an example method for providing an optimized video segment, in accordance with at least one embodiment.

FIG. 9 is a flowchart illustrating an example method 900 for providing an optimized video segment, in accordance with at least one embodiment. The method 900 may be performed by a computing device. The computing device may include one or more processors, and one or more memories storing computer-executable instructions that, when executed with the one or more processors, cause the computing device to perform the operations of method 900.

The method 900 may begin at 902, where a derivative video segment associated with a portion of video content may be obtained (e.g., by the segmentation manager 812). By way of example, derivative content (e.g., a movie trailer) associated with video content (e.g., a movie) may be segmented (e.g., separated into derivative video segments) by the segmentation manager 812 according to the segmentation operations described in connection with FIGS. 2 and 3.

At 904, a starting frame within the video content corresponding to a start of the derivative video segment may be identified (e.g., by the localization manager 814 of FIG. 8). In some embodiments, the starting frame may be identified based at least in part on executing operations of a video search of the video content using the derivative video segment as a search query. Example operations for performing this video search are described above in connection with FIGS. 4 and 5.

At 906, an ending frame within the video content corresponding to an end of the derivative video segment may be identified (e.g., by the segment optimization manager 816 of FIG. 8). In some embodiments, the ending frame may be identified based at least in part on a length associated with the derivative video segment.

At 908, an optimized video segment may be generated (e.g., by the segment optimization manager 816) from the video content. In some embodiments, the optimized video segment may be generated based at least in part on the starting frame and the ending frame identified within the video content for the derivative video segment.

At 910, the optimized video segment may be transmitted to a remote computing device. In at least one embodiment, the optimized video segment may be selected for transmission based at least in part on a ranking identified (e.g., by the segment ranking module 818). In some embodiments, the remote computing device can be associated with a curator (e.g., a user who is tasked with identifying particular optimized video segments that are to be subsequently provided to other users of a system, such as a video streaming system). In some embodiments, the remote computing device can be associated with a user, such as a user of a video streaming system.

Figure 10:
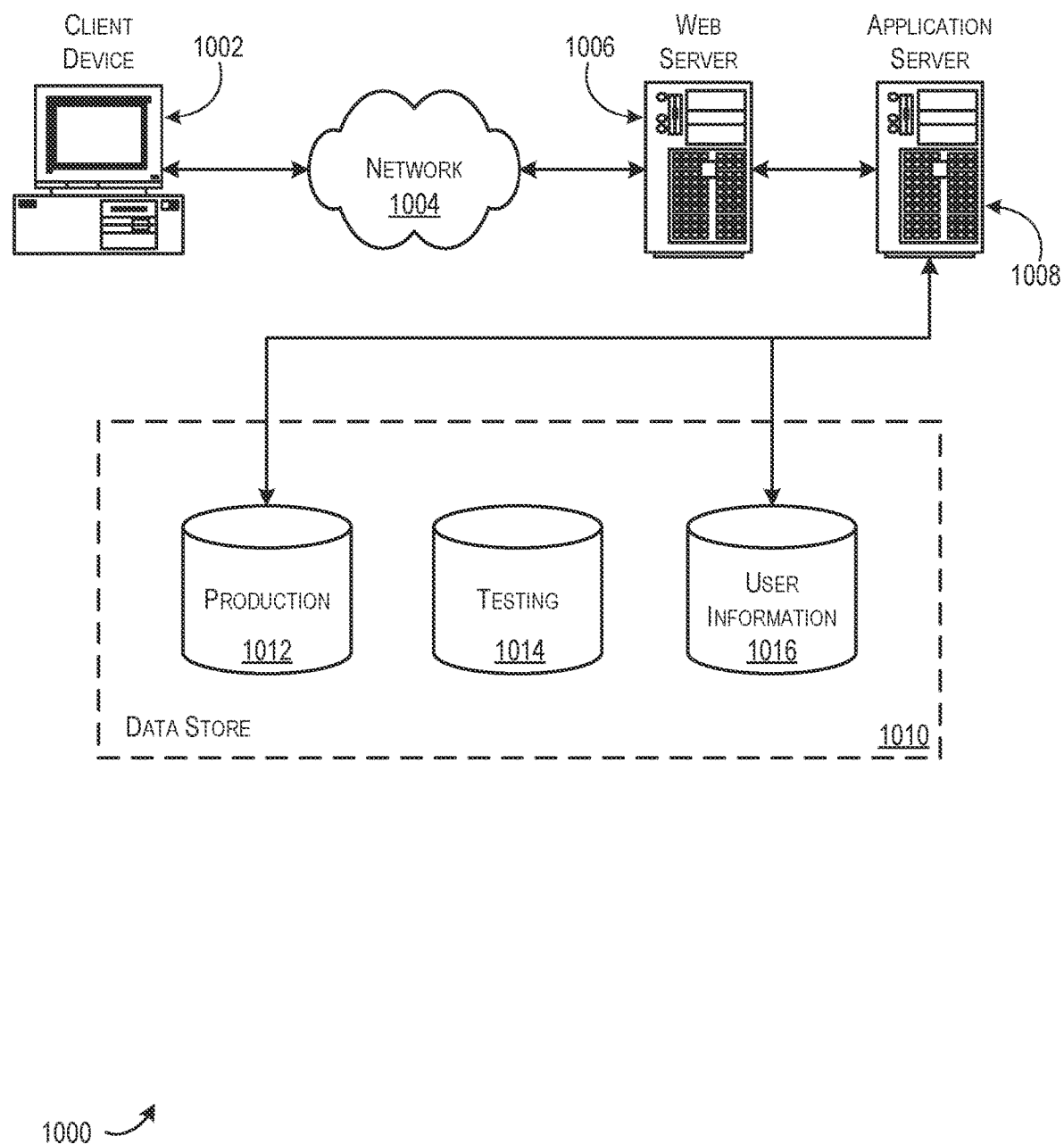
FIG. 10 is a schematic diagram illustrating an example environment for implementing aspects of the invention in accordance with at least one embodiment described herein.

FIG. 10 illustrates aspects of an example system 1000 for implementing aspects in accordance with various embodiments. As will be appreciated, although a Web-based environment is used for purposes of explanation, different environments may be used, as appropriate, to implement various embodiments. The environment includes an electronic client device 1002, which can include any appropriate device operable to send and receive requests, messages, or information over an appropriate network 1004 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the electronic client device 1002 and the application server 1008, can be handled by the Web server. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing production data 1012 and user information 1016, which can be used to serve content for the production side. The data store also is shown to include a mechanism for storing log data 1014, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the electronic client device 1002. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk®. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    obtaining, by a computing device, a derivative video segment associated with a portion of video content;
    obtaining a machine-learning model, the machine-learning model being trained to identify a set of feature vectors for video frames provided as input;
    identifying, by the computing device, a starting frame within the video content corresponding to a start of the derivative video segment, the starting frame being determined based at least in part on:

obtaining, using the machine-learning model, a first set of feature vectors for a first set of video frames of the video content;
obtaining, using the machine-learning model, a second set of feature vectors for a second set of video frames of the derivative video segment; and
determining a degree of similarity between the first set of video frames of the video content and the second set of video frames of the derivative video segment based at least in part on determining similarities between the first set of feature vectors and the second set of feature vectors;
determining, from audio content corresponding to the video content, that using the starting frame as a first frame for generating an optimized video segment from the video content would interrupt dialog occurring at a first time within the audio content corresponding to the starting frame within the video content;
identifying an adjusted starting frame different from the starting frame based at last in part on selecting an earlier video frame occurring prior to the starting frame within the video content, the adjusted starting frame being identified based at least in part on determining the dialog would be interrupted if the starting frame was selected;
identifying, by the computing device, an ending frame within the video content based at least in part on the adjusted starting frame and a length of the derivative video segment;
generating, by the computing device, the optimized video segment from the video content, the optimized video segment being generated based at least in part on 1) the adjusted starting frame identified from the starting frame of the derivative video segment identified within the video content and 2) the ending frame identified within the video content; and
transmitting, by the computing device, the optimized video segment to a remote computing device.

2. The computer-implemented method of claim 1, wherein using the machine-learning model to obtain the first set of feature vectors comprises:
identifying the first set of video frames of the video content;
providing, as input to the machine-learning model, first input data comprising at least one of the first set of video frames;
receiving, as output from the machine-learning model, the first set of feature vectors individually comprising features extracted from a corresponding video frame provided in the first input data.

3. The computer-implemented method of claim 2, wherein using the machine-learning model to obtain the second set of feature vectors comprises:
identifying the second set of video frames of the derivative video segment;
providing, to the machine-learning model, second input data comprising at least one of the second set of video frames of the derivative video segment; and
receiving the second set of feature vectors individually comprising features extracted from a respective video frame of the derivative video segment provided in the second input data.

4. The computer-implemented method of claim 3, further comprising:
generating a similarity score quantifying the degree of similarity between the first input data comprising the at least one of the first set of video frames of the video content and the second input data comprising the at least one of the second set of video frames of the derivative video segment; and
selecting a particular frame of the at least one of the first set of video frames of the video content as the starting frame of the derivative video segment within the video content based at least in part on the similarity score.

5. The computer-implemented method of claim 1, further comprising determining the adjusted starting frame of a corresponding segment of the video content based at least in part on detecting dialog speech within audio corresponding to the starting frame of the derivative video segment within the video content, wherein detecting the dialog speech utilizes a voice activity detection model that is trained with supervised learning techniques and a labeled dataset of audio and binary voice labels derived from subtitles obtained from corresponding video.

6. The computer-implemented method of claim 1, wherein determining that using the starting frame as the first frame for the optimized video segment would interrupt the dialog further comprises:
obtaining a first audio segment occurring before the first time within the audio content;
obtaining a second audio segment occurring after the first time within the audio content; and
determining that at least one of the first audio segment or the second audio segment comprises the dialog.

7. The computer-implemented method of claim 1, wherein identifying the adjusted starting frame for generating the optimized video segment from the video content, further comprises:
identifying second dialog occurring within a predefined period of time prior to the first time within the audio content;
identifying third dialog occurring within the predefined period of time after the first time within the audio content;
incrementally adjusting the first time to a second time earlier within the audio content until the second time corresponds to a portion of the audio content that has no dialog occurring within the predefined period of time prior to the second time or following the second time; and
selecting a particular video frame corresponding to the second time within the video content as the adjusted starting frame with which the optimized video segment is generated.

8. The computer-implemented method of claim 1, wherein determining that the starting frame is suboptimal for generating the optimized video segment corresponding to the derivative video segment further comprises executing a shot detection algorithm to identify an abrupt transition occurring prior to the starting frame within the video content.

9. A computing device, comprising:
one or more processors; and
one or more memories storing executable instructions that, when executed with the one or more processors, cause the computing device to:
obtain a machine-learning model, the machine-learning model being trained to identify a set of feature vectors for video frames provided as input;
obtain a derivative video segment associated with a portion of video content;
identify a starting frame within the video content corresponding to a start of the derivative video segment, the starting frame being identified based at least in part on executing operations that cause the computing device to:

obtain, using the machine-learning model, a first set of feature vectors for a first set of video frames of the video content;

obtain, using the machine-learning model, a second set of feature vectors for a second set of video frames of the derivative video segment; and determine a degree of similarity between the first set of video frames of the video content and the second set of video frames of the derivative video segment based at least in part on determining similarities between the first set of feature vectors and the second set of feature vectors;

determine, from audio content corresponding to the video content, that using the starting frame as a first frame for generating an optimized video segment from the video content would interrupt dialog occurring at a first time within the audio content corresponding to the starting frame within the video content;

identify an adjusted starting frame different from the starting frame based at last in part on selecting an earlier video frame occurring prior to the starting frame within the video content, the adjusted starting frame being identified based at least in part on determining the dialog would be interrupted if the starting frame was selected;

identify an ending frame within the video content based at least in part on the adjusted starting frame and a length of the derivative video segment;

generate the optimized video segment from the video content, the optimized video segment being generated based at least in part on 1) the adjusted starting frame identified from the starting frame of the derivative video segment identified within the video content and 2) the ending frame identified within the video content; and transmit the optimized video segment to a remote computing device.

10. The computing device of claim 9, wherein the derivative video segment includes an overlaid image presented over at least one frame of the derivative video segment, and wherein the optimized video segment generated from the video content does not include the overlaid image.

11. The computing device of claim 9, wherein executing the instructions further causes the computing device to:

identify a first language associated with the derivative video segment;

identify a second language associated with a user profile; and select the video content from differing versions of the video content based at least in part on the video content being associated with the second language associated with the user profile.

12. The computing device of claim 9, wherein executing the instructions further causes the computing device to:

generate a plurality of optimized video segments from different derivative video segments associated with corresponding portions of the video content; and classify each of the optimized video segments as being associated with a category of a plurality of categories, wherein a particular optimized video segment is selected for presentation to a particular user based at least in part on a user preference indicating a preference to view video segments associated with the category.

13. The computing device of claim 9, wherein executing the instructions further causes the computing device to identify the adjusted starting frame within the video content as the starting frame corresponding to the derivative video segment based at least in part on executing a voice activity detection algorithm, wherein the adjusted starting frame occurs earlier than the starting frame within the video content.

14. The computing device of claim 9, wherein executing the instructions further causes the computing device to identify a different ending frame within the video content as the ending frame corresponding to the derivative video segment based at least in part on executing a voice activity detection algorithm, wherein the different ending frame occurs later than the ending frame within the video content.

15. The computing device of claim 9, wherein executing the instructions to obtain the derivative video segment further causes the computing device to identify a plurality of derivative video segments from a derivative video based at least in part on executing at least one segmentation protocol, the plurality of derivative video segments comprising the derivative video segment, wherein executing the at least one segmentation protocol causes the computing device to detect at least one transition within the derivative video.

16. A non-transitory computer-readable storage medium comprising computer executable instructions that, when executed by one or more processors of a computing device, cause the computing device to:

obtain a machine-learning model, the machine-learning model being trained to identify a set of feature vectors for video frames provided as input;

identify a derivative video segment from derivative video content that is associated with video content;

identify a starting frame of a portion of the video content corresponding to the derivative video segment based at least in part on executing operations that cause the computing device to:

obtain, using the machine-learning model, a first set of feature vectors for a first set of video frames of the video content;

obtain, using the machine-learning model, a second set of feature vectors for a second set of video frames of the derivative video segment; and determine a degree of similarity between the first set of video frames of the video content and the second set of video frames of the derivative video segment based at least in part on determining similarities between the first set of feature vectors and the second set of feature vectors;

determine, from audio content corresponding to the video content, that using the starting frame as a first frame for generating an optimized video segment from the video content would interrupt dialog occurring at a first time within the audio content corresponding to the starting frame within the video content;

identify an adjusted starting frame different from the starting frame based at last in part on selecting an earlier video frame occurring prior to the starting frame within the video content, the adjusted starting frame being identified based at least in part on determining the dialog would be interrupted if the starting frame was selected;

generate the optimized video segment from the video content, the optimized video segment being generated based at least in part on 1) the adjusted starting frame identified from the starting frame of the derivative video segment identified within the video content and 2) an ending frame identified based at least in part on the adjusted starting frame; and execute one or more operations with the optimized video segment.

17. The non-transitory computer-readable storage medium of claim 16, wherein generating the optimized video segment from the video content further causes the computing device to apply a visual fade to at least one of a start or end of the optimized video segment.

18. The non-transitory computer-readable storage medium of claim 16, wherein executing the instructions further causes the computing device to:

generate a quality score for the optimized video segment;

select the optimized video segment from a plurality of optimized video segments based at least in part on the quality score; and provide, to a remote computing device, the optimized video segment based at least in part on the selection.

19. The non-transitory computer-readable storage medium of claim 18, wherein the quality score is generated based at least in part on at least one of: a luminance associated with the optimized video segment, an average amount of perceived loudness, an average amount of human voice activity, an average facial area of one or more faces presented within the optimized video segment, an indication that the optimized video segment lacks opening or closing credits, an average amount of motion detected within the optimized video segment, or a total duration of the optimized video segment.

* * * * *